INVENTOR.
CHARLES W. MATTHEWS

United States Patent Office 2,971,593
Patented Feb. 14, 1961

2,971,593

MOLDBOARD PLOW ATTACHMENT

Charles W. Matthews, East Moline, Ill., assignor, by mesne assignments, to Deere & Company, a corporation of Delaware Filed Apr. 7, 1958, Ser. No. 726,922

4 Claims. (Cl. 172—765)

The present invention relates generally to agricultural implements and more particularly to plow bottoms.

The object and general nature of the present invention is a provision of an attachment for the plow bottom that adapts the plow bottom for effective use under operating conditions for which the plow bottom as originally produced was not adapted. Specifically, it is an important feature of this invention to provide an attachment for the wing of a moldboard plow so as to increase the turning effect, whereby first, the plow will satisfactorily invert the furrow slice, even when operating at the slower speed than that for which the plow bottom was originally designed. Second, it is a feature of this invention to provide an attachment which permits the plow bottom to function satisfactorily under conditions where it is necessary to throw the furrow slice uphill.

An additional feature of this invention is a provision of an attachment for a mold board type plow bottom in which the attachment consists of a pad shaped at its inner face to fit snugly against the wing of the mold board and formed with the forward face which forms a fairly smooth continuation of the mold board surface but shaped to provide an increased curvature, as compared with the curvature of the mold board wing section itself, thus adapting the plow bottom for operation under conditions different from those for which the plow bottom was originally designed.

These and other objects and advantages of the present invention will be apparent to those skilled in the art after a consideration of the following detailed description, taken in conjunction with the accompanying drawings in which.

Figure 1:
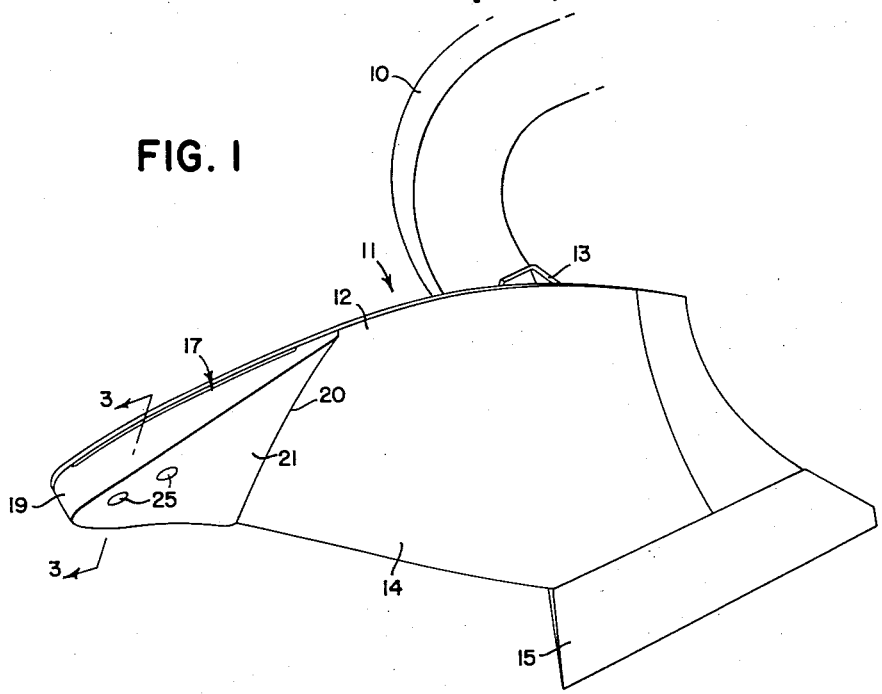
Fig. 1 is a perspective view of a conventional plow bottom with the attachment of the present invention mounted in place on the main of the moldboard.

This invention has been shown by way of illustration as incorporated in a moldboard plow of more or less conventional construction, including a plow beam 10 and a plow bottom 11 that is made up of the usual moldboard 12 having the usual shin at the front landward edge, frog 13, and share 15, these parts normally being rigidly interconnected to provide the rigid structure necessary to lift, turn and invert the soil. As will be readily understood by those skilled in the art, the shape and curvature of the moldboard is largely determined by the kind of the soil and the speed of operation that characterizes the conditions under which the plow is expected to operate. For example, a plow designed to operate at a certain speed in non-gravelly soils usually has a moldboard curved and shaped to perform the desired pulverizing and inverting action, but occasionally the plow is called upon to operate under conditions where the soil contains appreciable quantities of gravel and similar material, such as may be encountered in territories where potatoes are grown, for example, which may make it necessary to operate the plow at a somewhat slower speed in order to secure the desired pulverizing and inverting of the furrow slice at the reduced speed. In other conditions, the plow may be called upon to throw the furrow slice uphill. In both of the conditions assumed, it would be very desirable to have some means to secure an increase in the curvature of the conventional moldboard so as to operate properly at a reduced speed and to impart sufficient velocity to the furrow slice to throw the same uphill, and yet not require the farmer or operator to purchase and maintain a plow specially shaped for this purpose.

Figure 2:
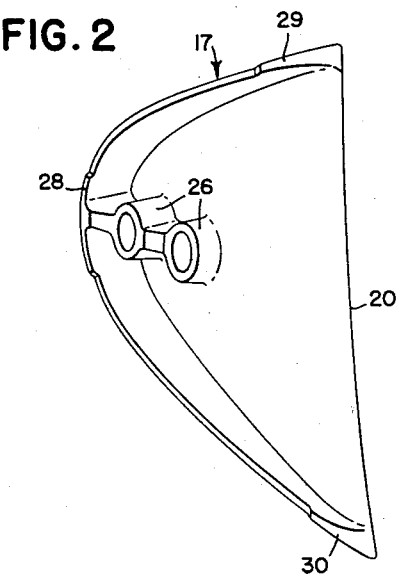
Fig. 2 is a perspective view of the rear face of the attachment pad, showing the relieved portions whereby a snug fit is assured, notwithstanding variations in the shape of the moldboard.
Figure 3:
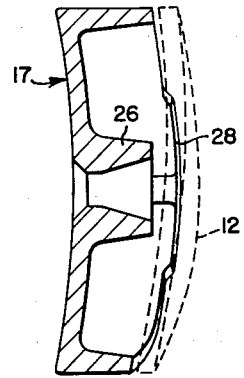
Fig. 3 is a sectional view taken generally along the line 3—3 of Fig. 1.

Some attempts have been made prior to my invention to solve this problem, but usually they have not been very satisfactory. For example, slat moldboards, or moldboards having one or more slits therein, with means in the nature of set screws or the like for deflecting the wing portions of the moldboard to secure the desired change in curvature, have been suggested, but generally these arrangements have not met with any appreciable success. In an effort to solve this problem, I have produced an attachment for a conventional moldboard in which the attachment takes the form of a pad 17 of generally wedge shape configuration, thicker at the upper and rearmost ends, as indicated in 19, and relatively thin at its forward portion 20 so as to form a fairly smooth juncture with the surface of the moldboard. As will be seen from Fig. 1, the thin edge 20 is disposed in an approximately straight line that lies generally perpendicular to the normal direction of soil flow across the moldboard. The attachment pad 17 has a rear face, best shown in Fig. 2 which snugly engages the face of the wing section 14 of the mold board 12 and the peripheral portion of the pad 17 is shaped so as to conform quite closely to the marginal edge portions of the moldboard, as will best be seen in Fig. 1. The outer or forward face of the attachment pad 17 is shaped, as indicated at 21 in Fig. 1, so as to form a fairly smooth continuation of the moldboard curvature, but the shape is such that the pad 17 provides a greater degree of curvature than that provided by the wing section itself. Thus, a conventional moldboard with my attachment pad therefore provides a plow that secures the desired pulverization and inversion of the furrow slice when operated at a speed appreciably slower than that which is usually considered normal. Also, by virtue of the increased degree of curvature, a plow with my attachment secured thereto, is capable of operating satisfactorily even when throwing the furrow slice uphill.

According to my invention, the attachment pad 17 is secured directly to the face of the moldboard at the wing section thereof by a pair of plow bolts 25, these bolts extending through apertured bosses 26 formed in the attachment pad 17. The rear face of the attachment pad 17 is discontinuous in nature in that the portion that engages the face of the moldboard wing comprises a peripheral ridge formed of discontinuous sections 28, 29 and 30, which forms a three-point contact between the pad and the moldboard. The sections 28–30 extend from one end of the thin section 20 around the margin of the attachment to the other end of the edge 20. The rear or inner face of the attachment pad 17 is relieved at substantially all other points except at the thin edge 20 and the inner ends of the bosses 26. These inner ends are shaped as to lie a slight distance away from the generally curved surface of the wing portion of the moldboard 14. The wing section is apertured to receive the inner ends of the bolts 25.

Having described my invention, what I claim and desire to secure by Letters Patent is:

1. A plow attachment for the moldboard of a moldboard plow of the type in which the moldboard is shaped for relatively high speed operation, said attachment comprising a pad attachable to the wing portion of said moldboard and including a part having an outer face shaped to change the relative contour of the moldboard surface at the outer portion so as to provide an increased degree of curvature as compared with the curvature of said wing portion, the rear face of said pad presenting a plurality of three spaced apart peripheral moldboard-engaging ridge sections shaped to fit the wing portion of said moldboard, said rear face being relieved within said ridge sections, and fastening means lying within lines interconnecting said ridge sections fixing said pad to said moldboard and pressing said three ridge sections against the face of the moldboard.

2. A plow attachment as defined in claim 1, further characterized by said pad having a pair of inwardly extending apertured bosses located in the relieved portion of said pad and receiving said fastening means, the end portions of said apertured bosses being shaped to lie adjacent but spaced from the associated moldboard surface, whereby said pad contacts the latter only through said three ridge sections.

3. An attachment for the moldboard of a moldboard plow, comprising a curvature-increasing pad having a moldboard-engaging rear face shaped to fit the wing portion of a plow moldboard and a peripheral section corresponding substantially to the marginal configuration of the wing portion of the moldboard, said pad being thicker at its rear part than at its forward edge, the latter being relatively thin and the outer face of said pad being shaped to form a continuation of the moldboard at an increased degree of curvature as compared with the curvature of said wing portion, said pad having a peripheral ridge extending along the marginal portions of said pad generally from one end of the forward edge around to the other end thereof, the height of said peripheral ridge being reduced adjacent said forward edge so as to taper toward said forward edge, said peripheral ridge having separated raised moldboard-engaging sections.

4. An attachment for the moldboard of a moldboard plow of the type in which the moldboard is shaped to provide for furrow slice movement across the moldboard in a generally furrowward and rearwardly directed movement during relatively high speed operation, said attachment comprising a pad attachable to the wing portion of said moldboard and shaped so as to have a relatively thin edge at the landward side of the pad and a relatively thicker portion at the furrowward side of the pad, whereby said pad serves to increase the curvature of the soil-engaging surface of the combined moldboard and pad to thereby invert the furrow slice when operating at a slower speed, said pad comprising a part having an outer face shaped to change the relative contour of the moldboard surface at the outer portion so as to provide an increased degree of curvature as compared with the curvature of said wing portion.

References Cited in the file of this patent

UNITED STATES PATENTS

| | | |
|---|---|---|
| 44,535 | Lacy et al. | Oct. 4, 1864 |
| 90,271 | Kennedy | May 18, 1869 |
| 294,578 | Caldwell | Mar. 4, 1884 |
| 1,740,519 | Miller | Dec. 24, 1929 |
| 2,266,583 | Benjamin | Dec. 16, 1941 |